(12) United States Patent
Joshi et al.

(10) Patent No.: US 9,129,421 B2
(45) Date of Patent: *Sep. 8, 2015

(54) SYSTEM AND METHOD FOR DISPLAYING COMPLEX SCRIPTS WITH A CLOUD COMPUTING ARCHITECTURE

(71) Applicant: Pageflex, Inc., Marlborough, MA (US)

(72) Inventors: Lokesh Joshi, Noida (IN); Himanshi Joshi, Noida (IN)

(73) Assignee: PAGEFLEX, INC., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,773

(22) Filed: Sep. 12, 2013

(65) Prior Publication Data

US 2014/0009474 A1 Jan. 9, 2014

Related U.S. Application Data

(63) Continuation of application No. 12/903,703, filed on Oct. 13, 2010, now Pat. No. 8,542,235.

(51) Int. Cl.
*G06T 11/00* (2006.01)
*G06F 17/21* (2006.01)
*G06F 17/22* (2006.01)
*H04L 29/08* (2006.01)

(52) U.S. Cl.
CPC .............. *G06T 11/00* (2013.01); *G06F 17/214* (2013.01); *G06F 17/2223* (2013.01); *H04L 67/02* (2013.01)

(58) Field of Classification Search
CPC ...... G06T 11/00; H04L 67/02; G06F 17/2223; G06F 17/214
USPC .................................. 345/471; 709/203, 219
See application file for complete search history.

(56) References Cited

U.S. PATENT DOCUMENTS

| | | | |
|---|---|---|---|
| 5,526,477 A | 6/1996 | McConnell et al. | |
| 5,533,174 A | 7/1996 | Flowers, Jr. et al. | |
| 5,793,381 A | 8/1998 | Edberg et al. | |
| 5,920,880 A | 7/1999 | Dowdy et al. | |
| 6,583,789 B1 | 6/2003 | Carlson et al. | |
| 6,661,417 B1 | 12/2003 | Cheng | |
| 7,809,550 B1 | 10/2010 | Barrows | |
| 2002/0010725 A1 | 1/2002 | Mo | |
| 2005/0195171 A1 | 9/2005 | Aoki et al. | |
| 2006/0232588 A1 | 10/2006 | Opstad et al. | |
| 2007/0211062 A1 | 9/2007 | Engelman et al. | |
| 2007/0242071 A1 | 10/2007 | Harding | |
| 2008/0154911 A1 | 6/2008 | Cheng | |
| 2012/0092345 A1 | 4/2012 | Joshi et al. | |

Primary Examiner — Maurice L McDowell, Jr.
(74) Attorney, Agent, or Firm — Seyfarth Shaw LLP; Brian L. Michaelis

(57) ABSTRACT

A system and method for displaying complex scripts with a cloud computing architecture may include a client device and a cloud computing server. The client device accesses a web application via the internet and transmits a request containing complex scripts to the cloud computing server. The cloud computing server parses the text and breaks the text down to a sequence of characters of a particular script, and maps the Unicode of each character to a particular glyph to obtain a glyph ID for each character making a one to one relationship. The cloud computing server analyzes each character, assigns, and applies specific font related operations to each glyph. The cloud computing server optimizes and compresses the glyph ID and positioning data, and transmit the compressed data back to the client device to be rendered on the display of the client device.

18 Claims, 18 Drawing Sheets

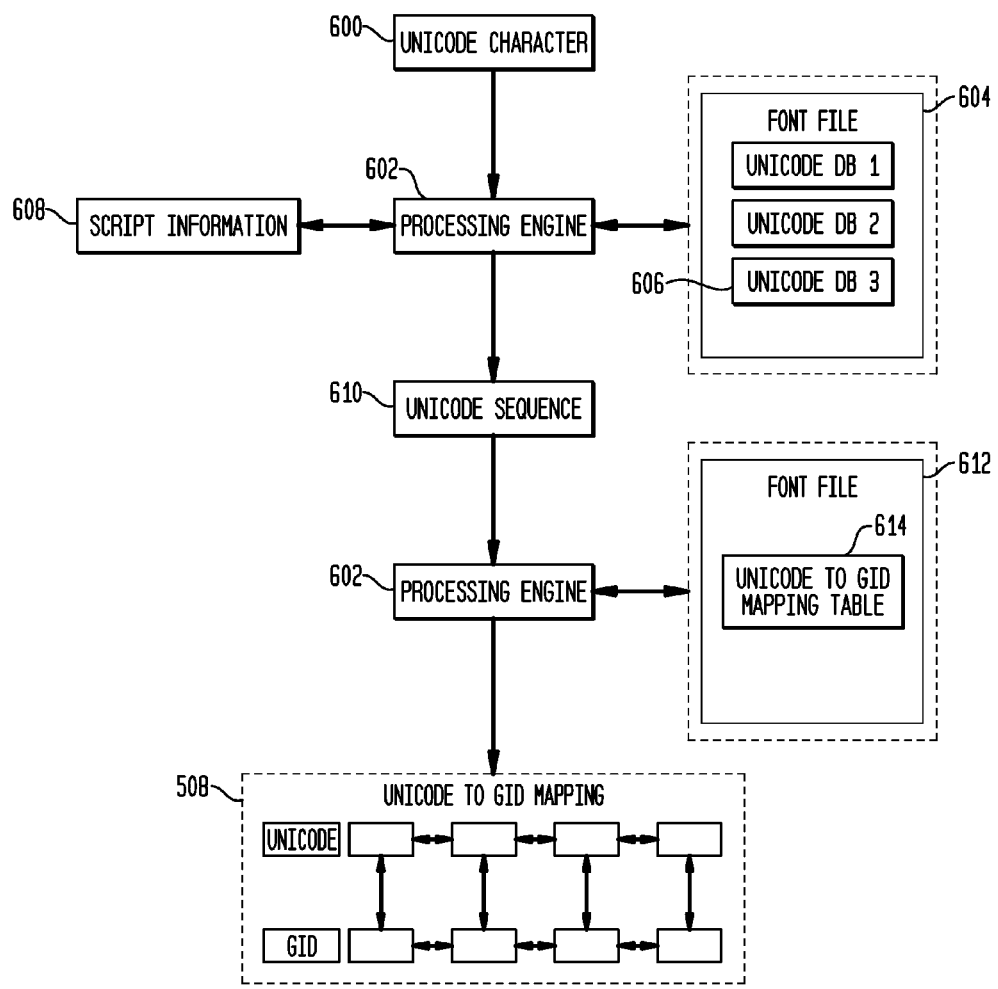

SYSTEM AND METHOD FOR DISPLAYING COMPLEX SCRIPTS WITH A CLOUD COMPUTING ARCHITECTURE

RELATED CASE INFORMATION

The present application is a continuation of U.S. patent application Ser. No. 12/903,703, filed Oct. 13, 2010, the entirety of which is incorporated herein by reference.

FIELD

The present disclosure relates to systems and methods for displaying web pages and general content having complex scripts through cloud computing technology. More specifically, the present disclosure relates to systems and methods for displaying, through cloud computing technology, web pages and general content having complex scripts upon small screens, screens with low resolution, and/or screens that are sufficiently distant from a viewer.

BACKGROUND

A complex script refers to a script family. The complex script may require complex transformations, and processing between text input and text display for proper layout and rendering on the display device. Generally, in order for a computer to understand and render such complex scripts requires the computer to have high processing power and resources, such as fonts, script specific rules, and layout and font engines.

In complex scripts the way text is stored is not mapped to the way it is displayed in a straightforward fashion as in Latin. Complex scripts are different from the Latin script in terms of interpretation and shape of a character. Unlike in the Latin script, characters in complex scripts may have a different interpretation and look or shape depending upon the context and/or the order of appearance of the characters. Some popular examples of complex scripts are the Brahmic script family (as Devanagari) and the Arabic script family. Some other common examples of complex script families are Indic, Hebrew, Thai, and Tibetan. In these complex scripts the look, shape, position and attachment of the glyph depends on the order of the characters and also on the contextual position of the characters in the text (i.e. what character precedes and/or follows it).

An example of a change of an Indic script character due to the presence of Halant after it and the presence of a constant after Halant is illustrated in FIG. 1. As illustrated in FIG. 1, an SA character 100 having a Unicode of (U+0938) changes shape due to a Halant character 102 having a Unicode of (U+094D) after the SA character 100 and the presence of a TA character 104 having a Unicode of (U+0924) after the Halant character 102. Specifically, the right vertical line of the SA character 100 is removed to form the SATA character 106.

Another example of Indic script characters combining to form a singleton ligature is illustrated in FIG. 2. As illustrated in FIG. 2, three initial characters, a JA character 200 having a Unicode of (U+91C), a Halant character 202 having a Unicode of (U+094D), and a NYA character 204 having a Unicode of (U+091E) generate a single GYA character 206. To generate the GYA character 206 the right vertical line of the JA character 200 is removed due to the presence of the Halant character 202 to form a Half JA character 208. Then the Half JA character 208 is combined with the NYA character 204 to form the final GYA character 206.

Lastly, an example of an alteration of a position of a dependant mark is illustrated in FIG. 3. As illustrated in FIG. 3, a character 300, a constant, having a Unicode of (U+0915) and a character 302, a dependant vowel, having a Unicode of (U+0941) are combined to form the character 304 having a glyph 306. The glyph 306 is not in the correct position, thus the glyph is repositioned horizontally along an axis 308 (x axis) to form the final character 310.

In today's technological world, there are multiple handheld computer devices, such as smart-phones, mobile phones, and/or PDAs (personal digital assistants) that are widely used. The handheld computer devices typically have approximately 240×320 pixel screens, and relatively limited computation power, memory, and/or bandwidth to the Internet. Due to their limited capabilities, most of the handheld computer devices lack the support for complex scripts while viewing the World Wide Web.

Some of the handheld computer devices do have support for one or two complex scripts, but that support is dependant on the original equipment manager (OEM) and local device availability. Generally, the handheld computer devices depend on the OEM preinstalled software support for rendering, layout and input of complex scripts. More specifically, in order for a handheld computer device to correctly layout and render a webpage with complex script the device may require the device's underlying platform support to install the fonts of the many complex scripts and the device may depend on the underlying software to support such complex scripts rendering. The OEM preinstalled software is usually limited to support for one or two complex scripts and few devices extend the support for complex languages on web content rendering. Further, not all handheld computer devices come with the support of layout, render and input of complex scripts and few devices support these complex scripts for web content rendering.

Currently some companies provide a limited amount of complex script support. The complex script support provided by these companies is done by creating images from the server of the complex script string and transferring the complex script string as an image over the network to the client.

Generally, handheld/mobile devices are low in computing power, and to parse various kinds of web content it takes a good deal of time and resources for the handheld device to interpret and render web content. Though there are solutions available for rendering web content, the solutions may have one or more of the following issues: the contents are limited to handheld/mobile contents, which carry low amounts of information, have low quality or no images and require multiple clicks; data transfers take more time than on a desktop due to low bandwidth connectivity; only partial web standards are supported; and the rendering of web pages is slow and buggy.

SUMMARY

The system and method for displaying complex scripts disclosed herein implements cloud computing services to improve the rendering, layout and input of complex languages on thin clients, such as a computer or a computer program which depends heavily on some other computer or server to fulfill its traditional computational roles, and/or computing devices with small or low resolution screens, such as handheld/mobile computer devices, smart-phones, mobile phones, PDAs, and/or computers with wrist or head mounted displays for browsing the World Wide Web or similar media.

Rendering web content with complex scripts through a cloud service addresses many of the above mentioned issues.

Rendering web content through a cloud service may, for example, allow for the rendering of true desktop content on the cloud; allow for the output of desktop class rendering to be optimized and compressed for the handheld/mobile device; allow nearly all web standards to be supported due to the availability of the computation power and memory resources of the cloud; and/or allow for faster data transfers due to less data transfer than normal and the rendering on the cloud having more computation power than the handheld/mobile device.

The system and method for displaying complex scripts through the use of cloud computing disclosed herein may enable nearly all devices to support the layout, rendering and input of complex scripts, driven by the support of cloud services. The system and method for displaying complex scripts discloses how computation work can be transferred to a cloud service to allow a thin client to render, layout and input complex scripts. More specifically, aspects of the disclosure relate to systems and methods of optimizing the browsing of a Webpage with text having complex script on a thin client or computer with relatively limited computation power, memory, or bandwidth to the Internet.

In an illustrative embodiment, the system and method for displaying complex scripts through the use of cloud computing may include a client device and a cloud computing server. The client device may access a web application via the internet, through which the client device may transmit a web page request containing complex scripts to the cloud computing server. The cloud computing server may receive the web page request from the client device. The cloud computing server may parse the text and break the text according to the script of each of the characters based on the Unicode page to which the Unicode has been allocated. The text may be broken down to a sequence of characters of a particular script (also referred to herein as a "run"). The cloud computing server may map the Unicode of each character to a particular glyph to obtain a glyph ID (GID) for each character making a one to one relationship.

For the runs containing complex script, the cloud computing server may analyze each character and assign specific font feature operations or rule sets to be applied to each glyph corresponding to the character of that run. The cloud computing server may reorder the character occurrence in the run. The cloud computing server may break a character into two or more Unicode characters and generate a glyph ID for each new Unicode character. The cloud computing server may add one or more glyphs apart from the existing glyphs for the Unicode.

The cloud computing server may then analyze the font feature operations or rule sets for each glyph and apply the corresponding transformations to the glyphs one by one. The font feature operations may be one or more of the following transformations: glyph substitution and/or glyph positioning. In glyph substitution the glyphs can be substituted, added, and/or broken down into more glyphs. The substitutions may result in one of the following mappings: one to one, many to one, one to many, and/or many to many. With the substitutions, a stream of glyph ID data may also be generated for the run, where one or more bears one of the above mapping relationships with the Unicode characters.

In glyph positioning the relative position of a glyph for rendering may be altered or repositioned along the x and/or y axis. This delta position change is generated after application of positioning related font rules. With the positioning a stream of delta positioning data may be generated for each run.

The cloud computing server may then optimize and compress the glyph ID and positioning data, wherein compression reduces the payload size and the time in transferring the data from the cloud computing server to the target client device. The cloud computing server may then transmit the compressed data back to the client device. Upon receiving the compressed data the client device may decode and decompress the glyph ID data stream as well as the compressed positioning data per text, run by run to be rendered on the client device's display.

In another embodiment the system and method for displaying complex scripts may utilize client side font rendering support, to allow a user to input the complex text and also treat the text as text while transferring the data from the cloud computing server to the client device to save the data bandwidth and provide speedy rendering. More specifically, after transferring the compressed data to the client device, the glyph ID stream and the positioning data may be passed to a font rendering engine of the client device to render the text elements. The font rendering engine may receive the glyph data for each glyph ID from the resident font data, apply the corresponding positioning data if applicable and render the data on the display area of the client device.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 6 illustrates a method of creating a run and generating a one to one Unicode to glyph ID sequence for each run;

DETAILED DESCRIPTION

Detailed embodiments of a system and method for displaying complex scripts through cloud computing technology are disclosed herein, however, it is to be understood that the disclosed embodiments are merely exemplary of the disclosed system and method, which may be embodied in various forms. Therefore, specific functional details disclosed herein are not to be interpreted as limiting, but merely as a basis for the claims and as a representative basis for teaching one skilled in the art to variously employ the disclosed system and method.

Figure 1:
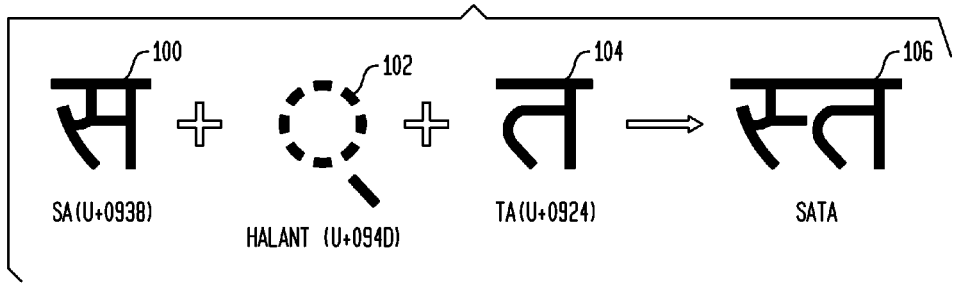
FIG. 1 illustrates an example of a change of an Indic script character due to the presence of other characters.
Figure 2:
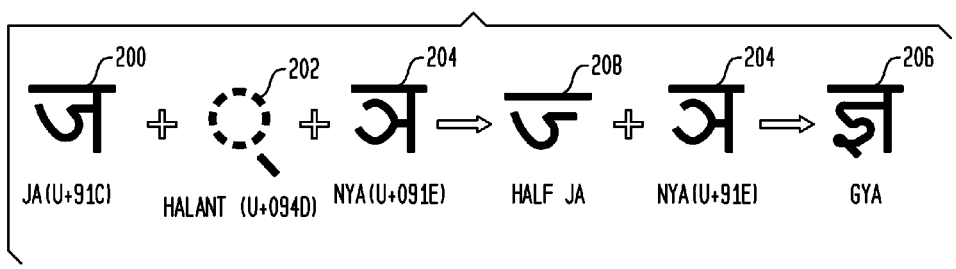
FIG. 2 illustrates an example of Indic script characters combining to form a singleton ligature.
Figure 3:
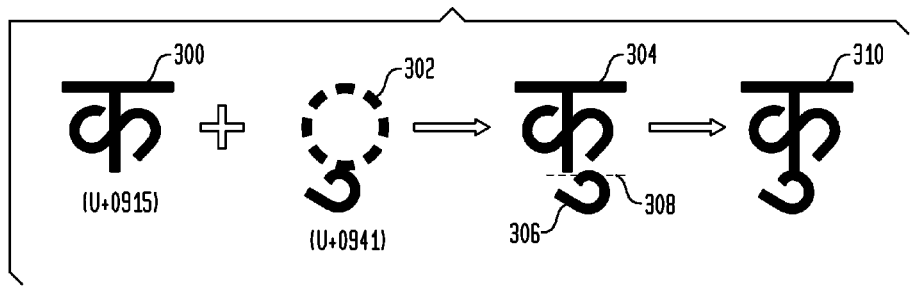
FIG. 3 illustrates an example of an alteration of a position of a dependant mark in the Indic script.
Figure 4:
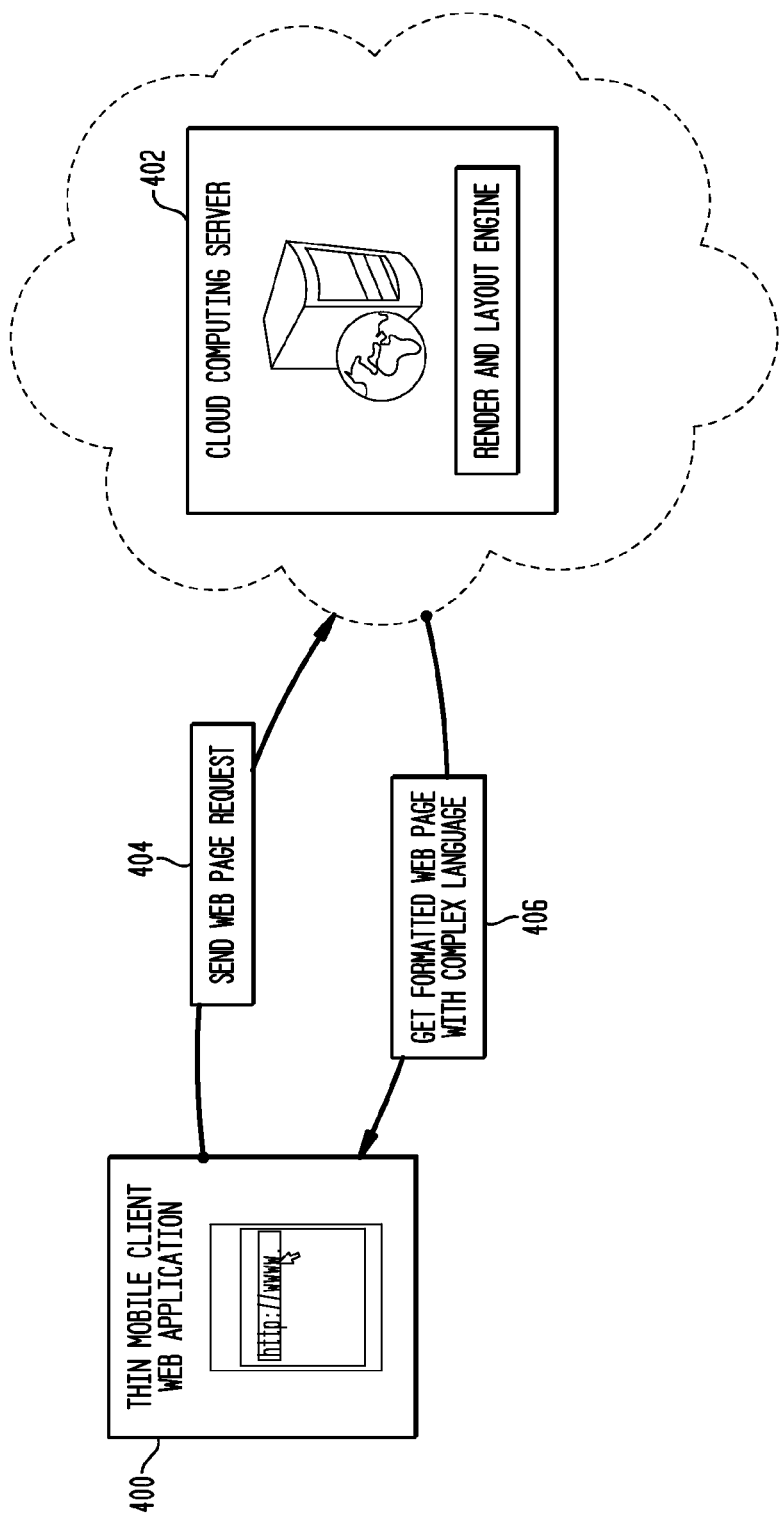
FIG. 4 illustrates a system architecture for implementing the system and method for displaying complex scripts through cloud computing technology.

A system architecture for implementing the system and method for displaying complex scripts through cloud computing technology according to an illustrative embodiment is described with reference to FIG. 4. The system architecture for displaying complex scripts through cloud computing technology may include at least one client device 400 of one or more users and at least one cloud computing server 402.

The client device(s) 400 may be an electronic communication device, such as but not limited to a thin client, such as a computer or a computer program which depends heavily on some other computer or server to fulfill its traditional computational roles. Thin clients may be, for example, wireless computers, computing devices with small or low resolution screens, and/or handheld/mobile computer devices, such as smart-phones, mobile phones, PDAs, and/or computers with wrist or head mounted displays.

The cloud computing server(s) 402 may include one or more computer resources which are consolidated in one or more locations. The computer resources may include, but are not limited to computers, server computers, modules, application and/or data servers, databases, and/or data processing devices.

The client device(s) 400 may be in communication with the cloud computing server(s) 402 over a wired or wireless network. The wired or wireless network may be a local area network or a wide area network and may be a private or public network of any size or scope. In an illustrative embodiment, the network is the Internet. More specifically, the client device(s) 400 may access a web application via the internet, through which the client device(s) 400 may send a request 404. The cloud computing server(s) 402 may be configured to receive the request 404 from the client device(s) 400, process the request and compress the requested data, and transmit 406 the compressed data back to the client device(s) 400 to be rendered on the client device(s)'s 400 display.

In one example the cloud computing server(s) 402 may receive a web page request 404 from the client device(s) 400 via the world wide web (W3) and/or internet. The cloud computing server(s) 402 may obtain the contents of the web page requested from the W3. The computing server(s) 402 may then parse, analyze, and render the text of the request 404, and compress the requested data and transmit 406 the data back to the client device(s) 400 via the W3 and/or internet. The compressed data may be transmitted 406 to the client device(s) 400 in the form of a web page. The client device(s) 400 may then decompress the compressed data allowing the client device(s) 400 to display the requested formatted web page. Although the request 404 is illustrated as a web page request, the request may be a document request. In a document request the cloud computing server may receive, process, and render a document request, such as a pdf and/or word document, containing complex script for display on the client device(s) 400.

Figure 5:
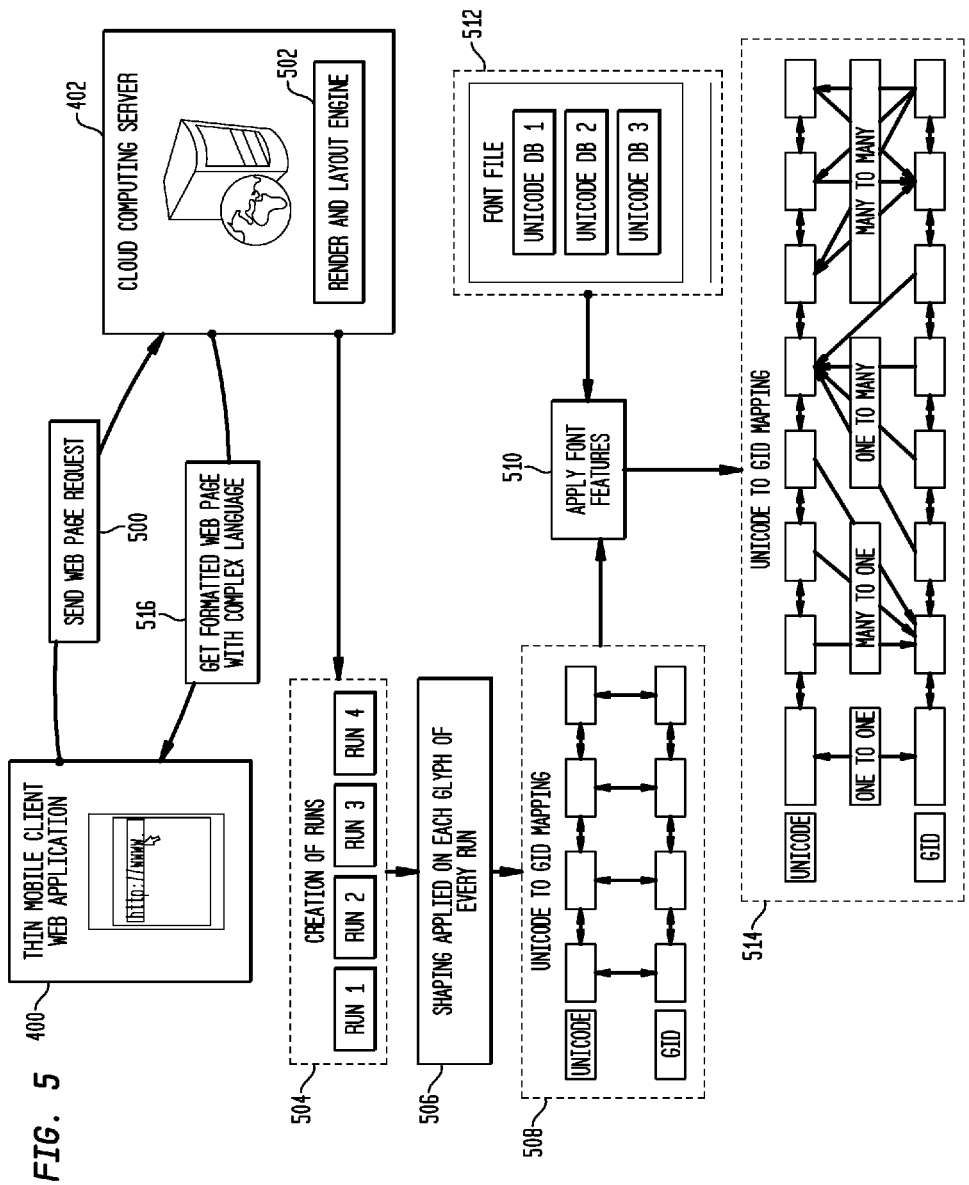
FIG. 5 illustrates a method of displaying complex scripts with a cloud computing architecture.

A method of displaying complex scripts with a cloud computing architecture according to an illustrative embodiment is described with reference to FIG. 5. The client device(s) 400 may access a web application via the internet, through which the client device(s) 400 may transmit one or more web page requests 500, such as a URL of a website, containing complex scripts to the cloud computing server(s) 402. The cloud computing server(s) 402 may receive the web page request(s) 500 from the client device(s) 400. The cloud computing server(s) 402 may obtain the contents of the web page request(s) 500 via the W3.

The cloud computing server(s) 402 may include at least one render and layout engine module 502 installed thereon. The render and layout engine module(s) 502 may be configured to parse the text lines of the web page and apply complex script operations and render the complex script text on the virtual buffer. The cloud computing server(s) 402 may create one or more "runs" 504, i.e. a sequence of characters of a particular script. Each of the run(s) 504 may be a sequence of characters that belong to a particular script. To create the run(s) 504 the cloud computing server(s) 402 may parse the text of the requested web page and break the text according to the script of each of the characters based on a Unicode page to which the Unicode has been allocated. The cloud computing server(s) 402 may apply shaping on each glyph 506 of each of the run(s) 504. The cloud computing server(s) 402 may map 508 the Unicode sequence of each run 504 to a particular glyph to obtain a glyph ID for each run 504. The Unicode sequence of each run 504 may be mapped to a glyph ID having a one to one relationship.

For the run(s) 504 containing complex script, the cloud computing server(s) 402 may analyze each character and apply 510 specific font related operations or rule sets to each of the one to one mapped Unicode to glyph ID sequences of each run 504. To apply 510 the font related operations the cloud computing server(s) 402 may access a font file 512, which may be contained on the cloud computing server(s) 402 or on separate servers or computers, containing tables of features and other font related rules. In an illustrative embodiment, the cloud computing server(s) 402 may apply glyph substitution 514, during which the glyphs can be substituted, added, and/or broken down into more glyphs. The glyph substitutions 514 may result in one or more of the following mappings: one to one, many to one, one to many, and/or many to many. The cloud computing server(s) 402 may then transmit 516 the complex script data back to the client device(s) 400. The cloud computing server(s) 402 may transmit 516 the complex script data in a formatted, optimized and compressed form back to the client device(s) 400. Upon receiving the complex script data the client device(s) 400 may render the complex script on the display area of the client device(s) 400.

A method of creating a run and generating a one to one Unicode to glyph ID sequence for each run according to an illustrative embodiment is described with reference to FIG. 6. To create a run, the cloud computing server(s) 402 parse the text of the requested web page sent to the cloud computing server(s) 402. The text is parsed to a Unicode character 600 of each character of text. The Unicode character 600 is processed by the cloud computing server(s) 402, which may have one or more processing engine modules 602 installed thereon configured to process the Unicode character 600. During the processing of the Unicode character 600 the processing engine module(s) 602 may communicate with one or more font files 604, which may be contained on the cloud computing server(s) 402 or on separate servers or computers, containing one or more databases 606 containing script information for Unicode values. The processing engine module(s) 602 may communicate with one or more font files 604 by accessing the font file(s) 604 and searching the font file(s) 604. The script information for Unicode values may be the standard Unicode script information. The processing engine modules(s) 602 may take the Unicode value 600 and search the font files(s) 604 to obtain the script 608 of the Unicode character 600.

After obtaining the script 608 of the Unicode character(s) 600 of the text of the web page, the processing engine modules(s) 602 of the cloud computing server(s) 402 may break the text according to the script 608 of each of the Unicode characters 600 based on the Unicode page to which the Unicode has been allocated. The text may be broken down to a sequence of characters of a particular script or a Unicode sequence 610 or run. The processing engine modules(s) 602 may then communicate with one or more font files 612, which may be contained on the cloud computing server(s) 402 or on separate servers or computers, containing one or more Unicode to glyph ID mapping tables 614 containing glyph IDs for each Unicode value. The processing engine module(s) 602 may communicate with one or more font files 612 by accessing the font file(s) 612 and searching the font file(s) 612.

The processing engine modules(s) 602 may take the Unicode value, search the font files(s) 612, and map the Unicode value to a particular glyph to obtain the glyph ID corresponding to the Unicode of each character in the Unicode sequence 610. The processing engine modules(s) 602 may take the Unicode sequence 610 and the corresponding glyph IDs obtained from the font file 612 and map 508 the Unicode of each character in the Unicode sequence 610 to the glyph IDs making a one to one relationship for each run creating a Unicode to glyph ID sequence for each run.

Figure 7A:
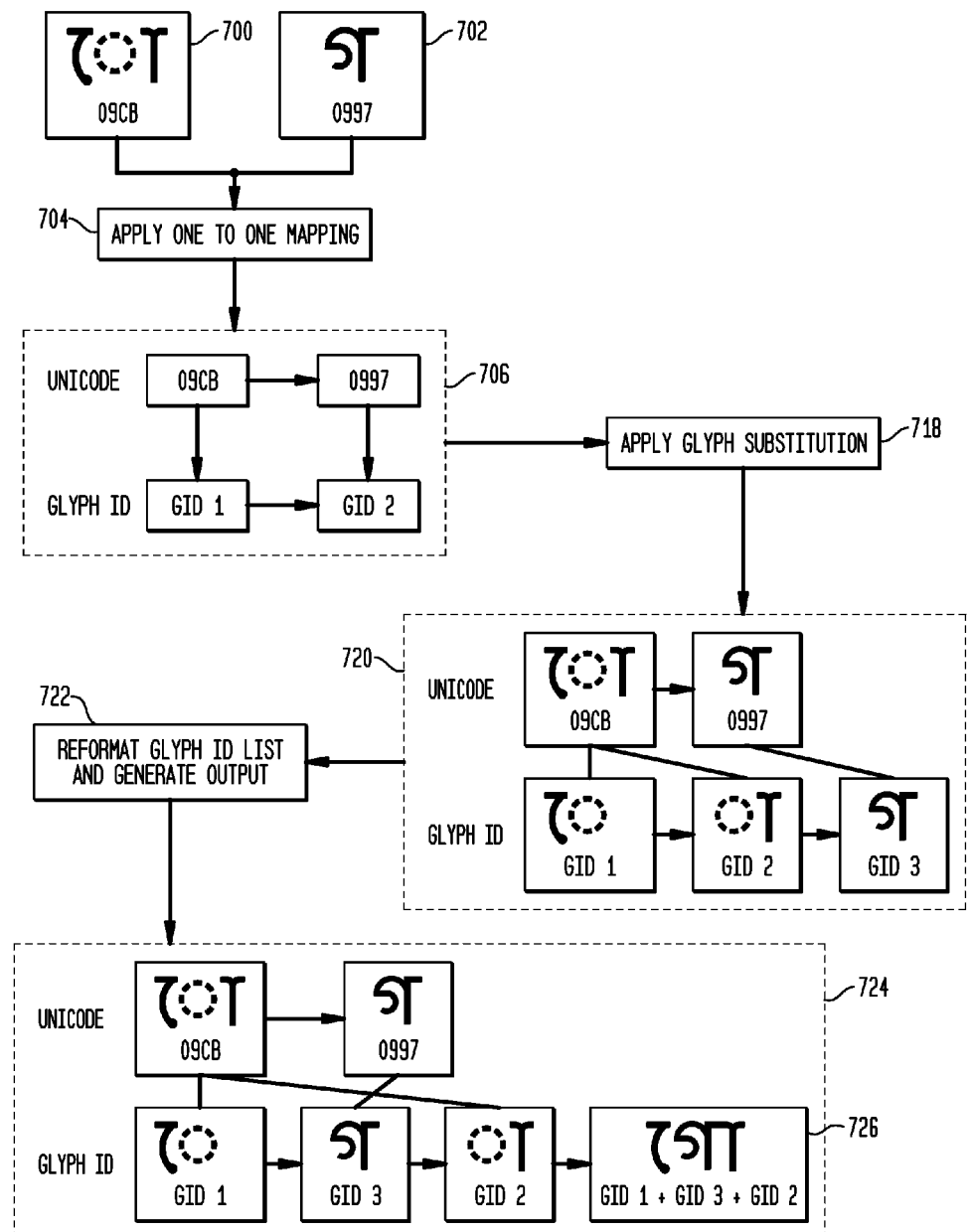
FIG. 7A illustrates an example of one to one and many to many Unicode to glyph ID mappings.

An example of one to one Unicode to glyph ID mappings according to illustrative embodiments are described with reference to FIGS. 7A-7C. As illustrated in FIG. 7A, a Unicode sequence is presented containing two characters, a character 700 having a Unicode of 09cb and a character 702 having a Unicode of 0997. The processing engine modules(s) 602 takes the Unicode values of characters 700 and 702 and searches the font files(s) 612 for the glyph ID for each Unicode value. The processing engine modules(s) 602 applies 704 one glyph ID to each of the corresponding Unicode values for the characters 700 and 702. The processing engine modules(s) 602, then maps 706 the Unicode values for the characters 700 and 702 to a particular glyph to obtain the glyph ID corresponding to the Unicode of each character 700 and 702. The mappings 706 illustrate the Unicode value for character 700 being mapped to a glyph ID, Gid 1, and the Unicode value for character 702 being mapped to a glyph ID, Gid 2 in a one to one relationship.

Figure 7B:
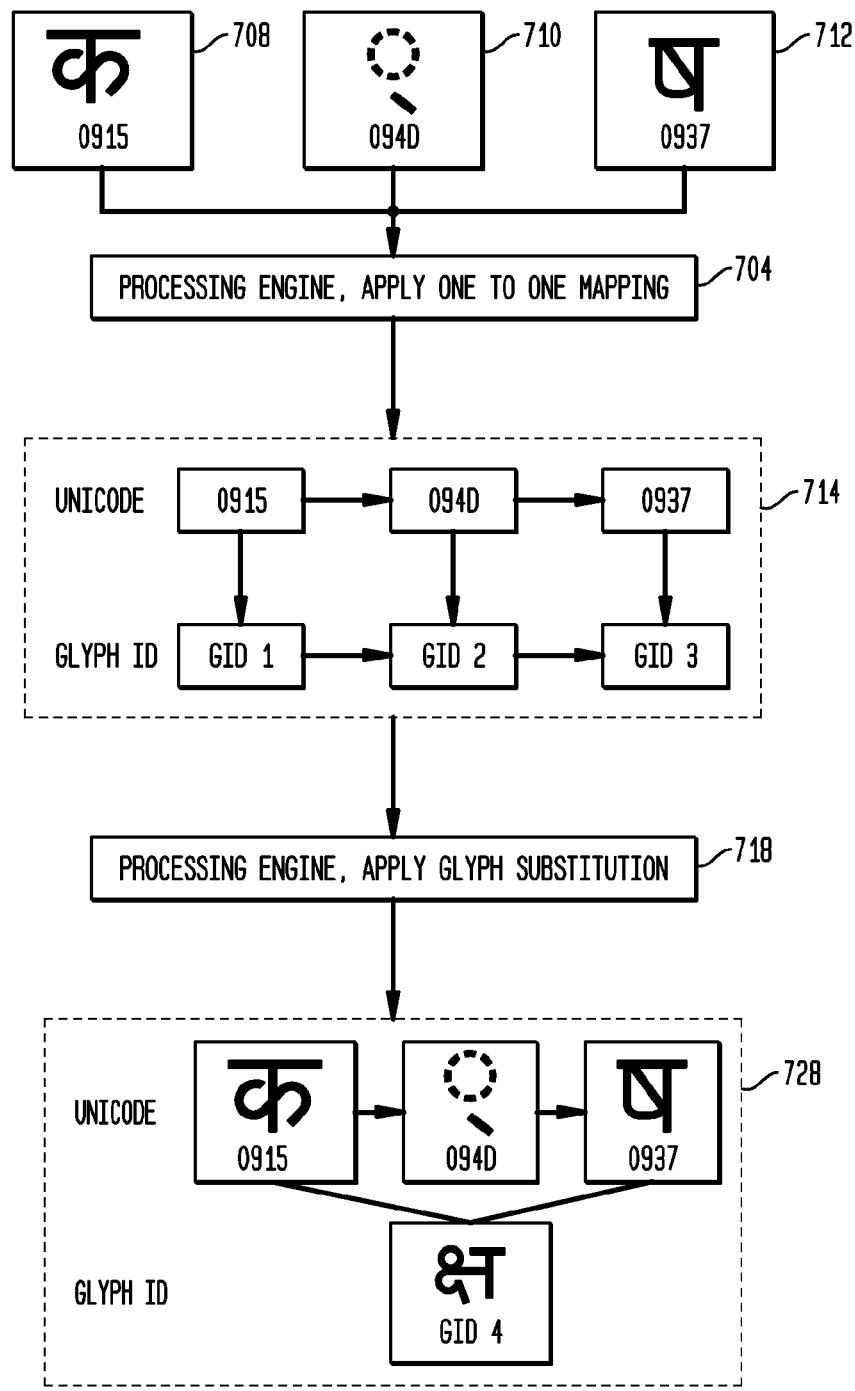
FIG. 7B illustrates an example of one to one and many to one Unicode to glyph ID mappings.
Figure 7C:
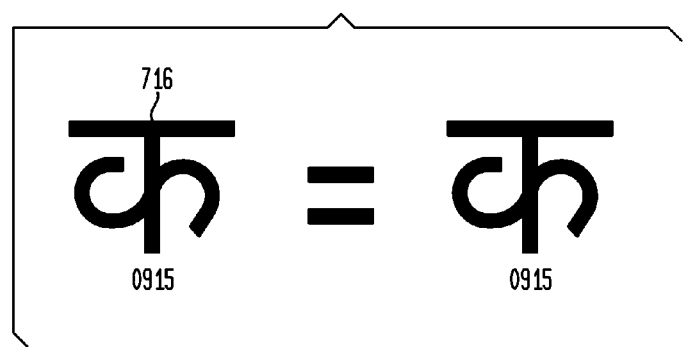
FIG. 7C illustrates an example of a one to one Unicode to glyph ID mapping.

As illustrated in FIG. 7B, a Unicode sequence is presented containing three characters, a character 708 having a Unicode of 0915, a character 710 having a Unicode of 094d, and a character 712 having a Unicode of 0937. The processing engine modules(s) 602 takes the Unicode values of characters 708, 710, and 712 and searches the font files(s) 612 for the glyph ID for each Unicode value. The processing engine modules(s) 602 applies 704 one glyph ID to each of the corresponding Unicode values for the characters 708, 710, and 712. The processing engine modules(s) 602, then maps 714 the Unicode values for the characters 708, 710, and 712 to a particular glyph to obtain the glyph ID corresponding to the Unicode of each character 708, 710, and 712. The mappings 714 illustrate the Unicode value for character 708 being mapped to a glyph ID, Gid 1, the Unicode value for character 710 being mapped to a glyph ID, Gid 2, and the Unicode value for character 712 being mapped to a glyph ID, Gid 3, in a one to one relationship.

Another example of a one to one Unicode to glyph ID mapping according to an illustrative embodiment is described with reference to FIG. 7C. A character 716 having a Unicode of 0915 is mapped to a single glyph ID by the processing engine modules(s) 602.

Figure 8:
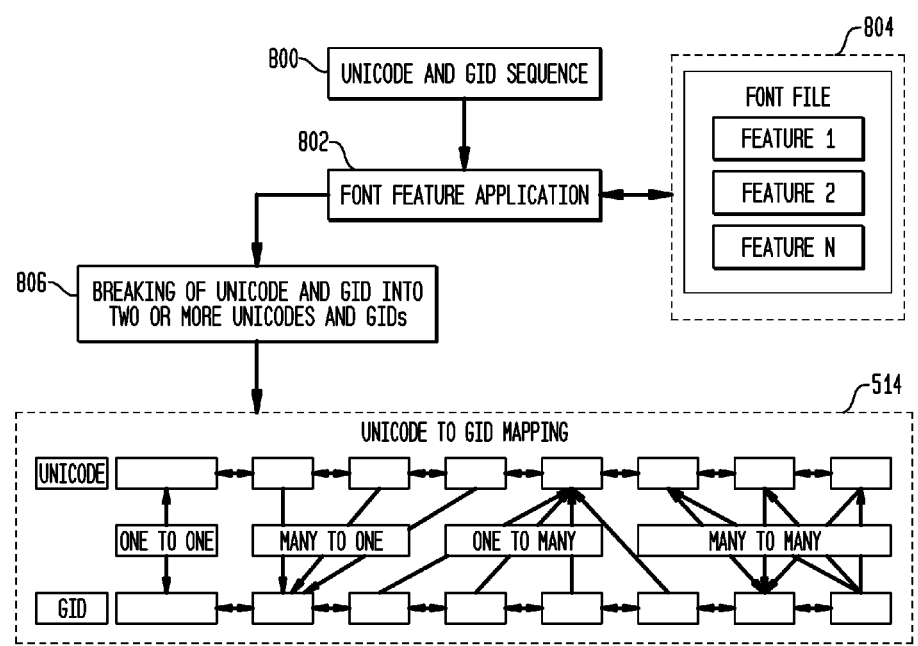
FIG. 8 illustrates a method of analyzing a run, assigning, and applying operations to each glyph corresponding to a character.

A method of analyzing a run, assigning, and applying operations to each glyph corresponding to a character according to an illustrative embodiment is described with reference to FIG. 8. For the runs containing complex script, the cloud computing server(s) 402 may analyze each character of the one to one mapped Unicode to glyph ID sequence 800 for each run. The cloud computing server(s) 402 may include one or more font feature application modules 802 installed thereon, which may be configured to analyze the Unicode to glyph ID sequence 800 for each run. The font feature application module(s) 802 may be a processing engine module, and may communicate with a font file 804, which may be contained on the cloud computing server(s) 402 or on separate servers or computers, containing feature tables and rules to be applied to the Unicode to glyph ID sequence 800 for each run. The font feature application module(s) 802 may communicate with one or more font files 804 by accessing the font file(s) 804 and searching the font file(s) 804. The font feature application module(s) 802 may communicate with the font file 804 and assign specific font related operations or rule sets that may be applied to each glyph corresponding to a character of the Unicode to glyph ID sequence 800 for each run.

In an illustrative embodiment, the font file(s) referred to in this disclosure may contain font features and rules for numerous font formats which can be interpreted by the cloud computing server(s) 402 and the processing engine module(s), such as but not limited to the OpenType Font (OTF) format and the Apple Type Services for Unicode Imaging (ATSUI) format. The font features may include glyph substitution features (GSUB) and glyph positioning features (GPOS). Based on the type of font feature, the font feature can have one or a set of basic rules. These rules individually or cumulatively are executed to achieve the needed operations for a font feature. Further, a font designer can also select a sequence of font features in a particular order to achieve the desired transformation on a Unicode string.

Figure 9:
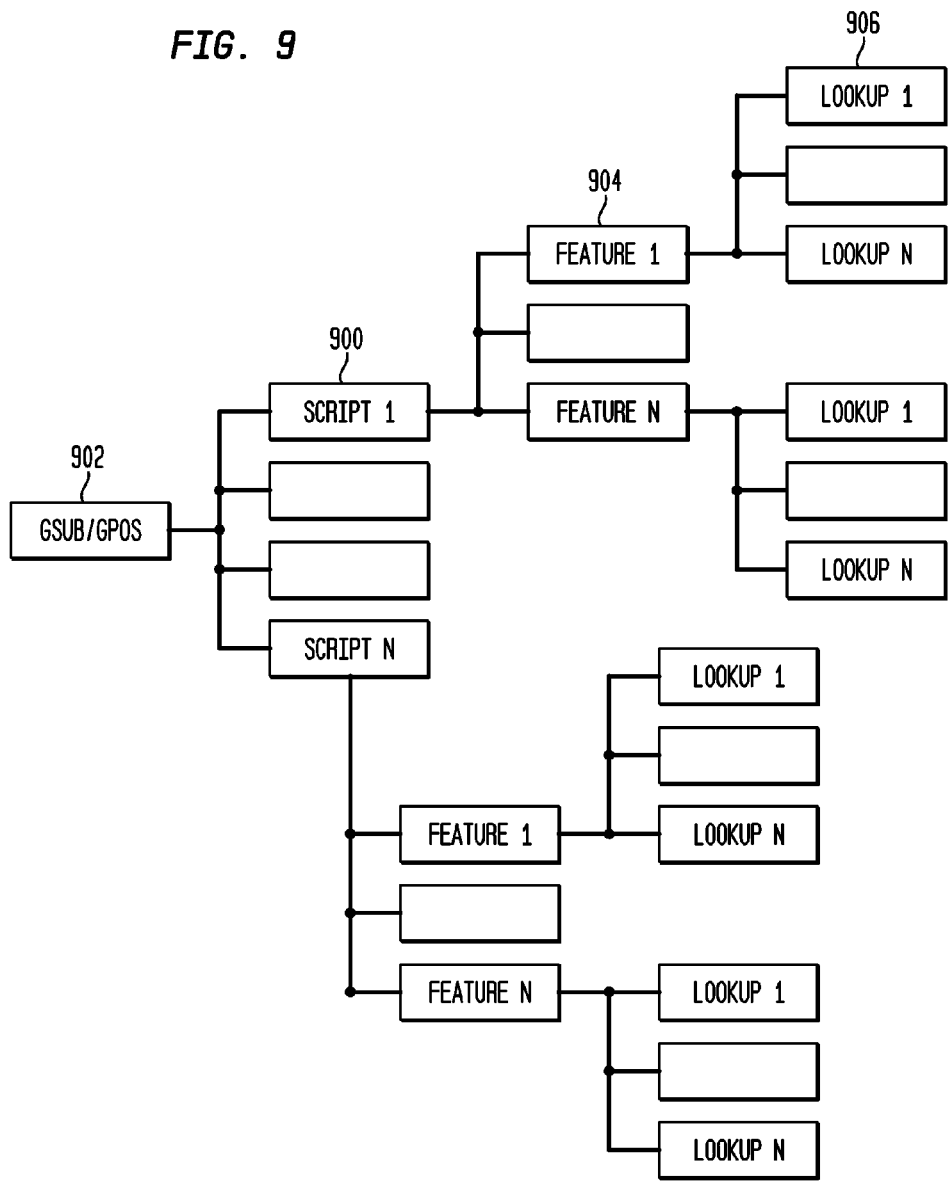
FIG. 9 illustrates an example of the contents of a font file in an OTF format.

The OTF format deals with complex scripts quite well and was developed after identifying the common script specific transformations that are applied to the Unicode strings. Generally, the set of font features are designed keeping a script or family of script in consideration. An example of the contents of a font file in an OTF format according to an illustrative embodiment is described with reference to FIG. 9. The font file for the OTF format contains a list of scripts 900 for the GSUB and GPOS features 902 separately, and each script 900 has a list of font features 904 it can support and each font feature 904 has a list of rules 906 (for example, lookups) it may apply.

In an illustrative embodiment, the font feature application module(s) 802 breaks a character into two or more Unicode characters and generates a glyph ID for each new Unicode character, 806. After the font feature application module(s) 802 breaks the character into two or more Unicode characters and generates a glyph ID for each new Unicode character the font feature application module(s) 802 may map 514 the Unicode character and/or new Unicode characters to the glyph IDs. The mappings 514 may result in one or more of the following mappings: one to one, many to one, one to many, and/or many to many. Although FIG. 8 illustrates breaking the character into two or more Unicode characters, the font feature application module(s) 802 may also reorder the character occurrence in the run and/or add one or more glyphs apart from the existing glyphs for the Unicode value.

An example of Unicode to glyph ID mappings according to an illustrative embodiments are described with reference to FIGS. 7A, 7B, and 7D. As illustrated in FIG. 7A, after the Unicode sequence, containing the two characters 700 and 702, is mapped making a one to one relationship, shaping and glyph substitution is applied 718. The shaping and glyph substitution 718 breaks the character 700 into two glyphs resulting in a one to many mapping for the character 700, and a one to one mapping for the character 702. As illustrated, the mappings 720 result in the Unicode value for character 700 being mapped to two glyph IDs, Gid 1 and Gid 2, and the Unicode value for character 702 being mapped to one glyph ID, Gid 3. Further, the glyph ID list is reformatted and an output is generated, 722. The character 702 is reordered to be in the middle of the two glyphs corresponding to the character 700 to generate an output 726.

As illustrated in FIG. 7B, after the Unicode sequence, containing the three characters, the character 708, the character 710, and the character 712, is mapped making a one to one relationship, shaping and glyph substitution is applied 718. The shaping and glyph substitution 718 results in a many to one mapping of Unicode to glyph ID. As illustrated, the mapping 728 results in the Unicode values for the two characters 708 and 712 being mapped to one glyph ID, Gid 4.

Figure 7D:
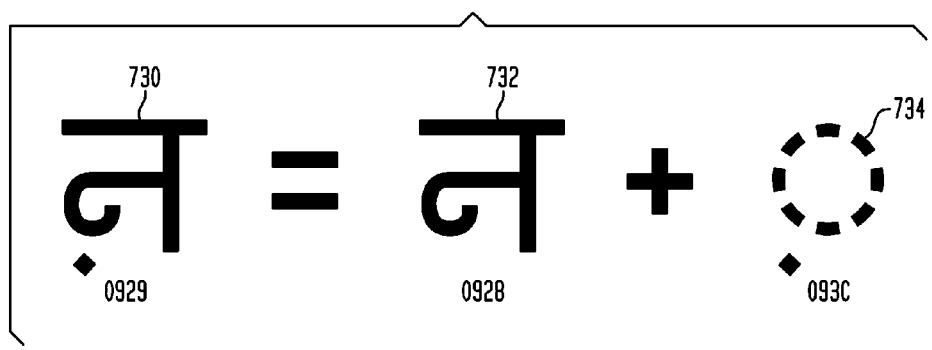
FIG. 7D illustrates an example of a one to many Unicode to glyph ID mapping.

In FIG. 7D, an example of a one to many Unicode to glyph ID mapping according to an illustrative embodiment is illustrated. A character 730 having a Unicode of 0929 breaks into two Unicode characters, a character 732 having a Unicode of 0928 and a character 734 having a Unicode of 093c. Then the two characters 732 and 734 are mapped to two glyph IDs. Thus, the character 730 is mapped to two glyphs resulting in a one to many mapping of Unicode to glyph IDs.

Figure 10:
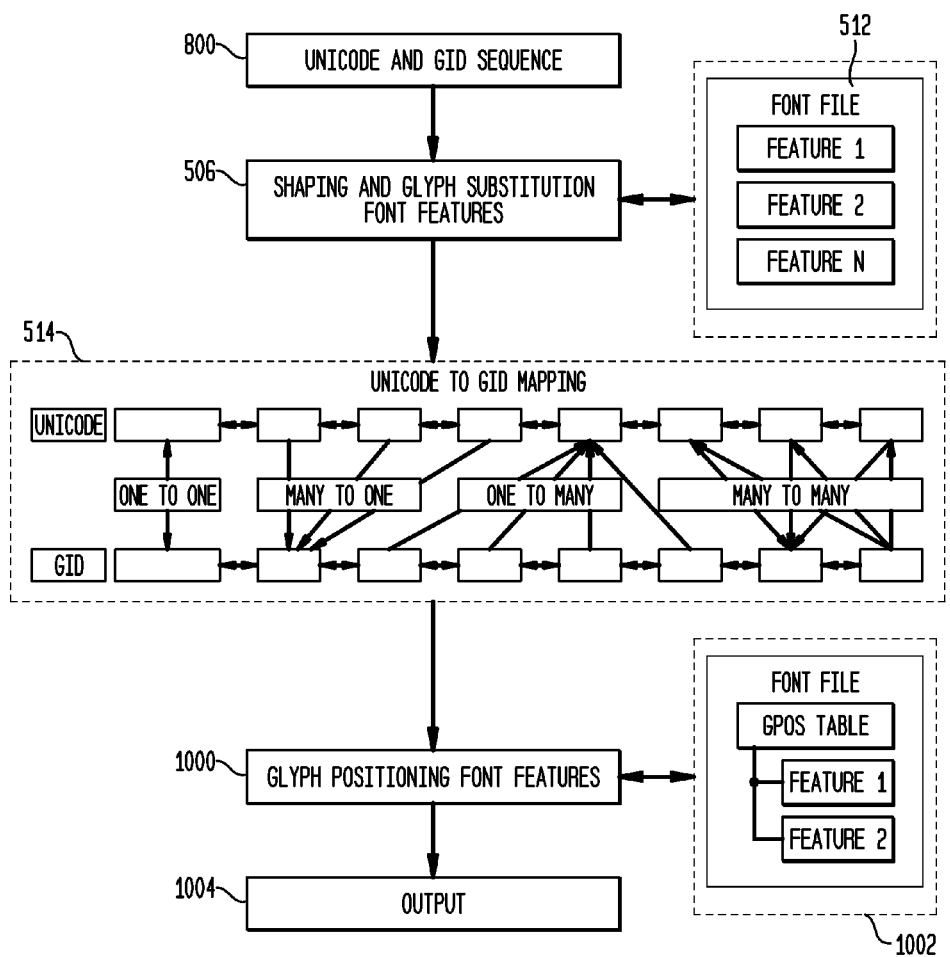
FIG. 10 illustrates a method of analyzing a run and applying glyph substitution and glyph positioning operations to each glyph corresponding to a character.

A method of analyzing a run and applying glyph substitution and glyph positioning operations to each glyph corresponding to a character according to an illustrative embodiment is described with reference to FIG. 10. For the runs containing complex script, the cloud computing server(s) 402 may analyze each character of the one to one mapped Unicode to glyph ID sequence 800 for each run and apply shaping and glyph substitution font features 506 to each run. The cloud computing server(s) 402 may communicate with the font file 512 containing tables of features and other font related rules to be applied to the Unicode to glyph ID sequence 800 for each run. The cloud computing server(s) 402 may communicate with one or more font files 512 by accessing the font file(s) 512 and searching the font file(s) 512.

Shaping is the method which determines the contextual position of the Unicodes, and based on the script type decides the kind of features from the font that should be applied. The decision of shaping is not font dependent, it is based on the script, but the features are picked from the font in focus, and the way they can affect the glyph ID stream is dependent on the way they are designed.

In an illustrative embodiment the shaping operations allocate the font feature to every glyph of the run based on its contextual position and the script property. Based on the script, the script table in the font file in focus is searched. If the script table is present, then the existence of the font feature is checked. If the font feature exists, low-level rules are queued for the glyph. The low-level rules are executed one by one on the glyph in focus until one of the rules is actually applied. By actual application, it means that some glyph substitution (in case of GSUB) or positioning (in case of GPOS) is done. The shaping operations may be applied to all the font features and for all the glyphs, one by one.

The cloud computing server(s) 402 may analyze the font specific operations or rule sets contained in the font file 512 for each glyph and apply the corresponding transformations to the glyphs one by one. In glyph substitution the transformations applied to the glyphs may result in the glyphs being substituted, added, and/or broken down into more glyphs. The cloud computing server(s) 402 may apply the GSUB application contained in the font file 512. The GSUB application may include a number of low-level operations or rules, such as but not limited to Single, Multiple, Alternate, Ligature, Context, and Chaining Context operations or rules. The Single operation replaces one glyph with one glyph. The Multiple operation replaces one glyph with more than one glyph. The Alternate operation replaces one glyph with one of many glyphs. The Ligature operation replaces multiple glyphs with one glyph. The Context operation replaces one or more glyphs in context. The Chaining Context operation replaces one or more glyphs in chained context. Any combination of the low-level operations or rules may cerate a feature, wherein the features are registered per script or script family. As an example, the GSUB transformation for a ligature creation (क्त) is done through the combination of two registered features for Devanagari, the HALN (Halant) and the LIGA (Ligature).

Figure 11:
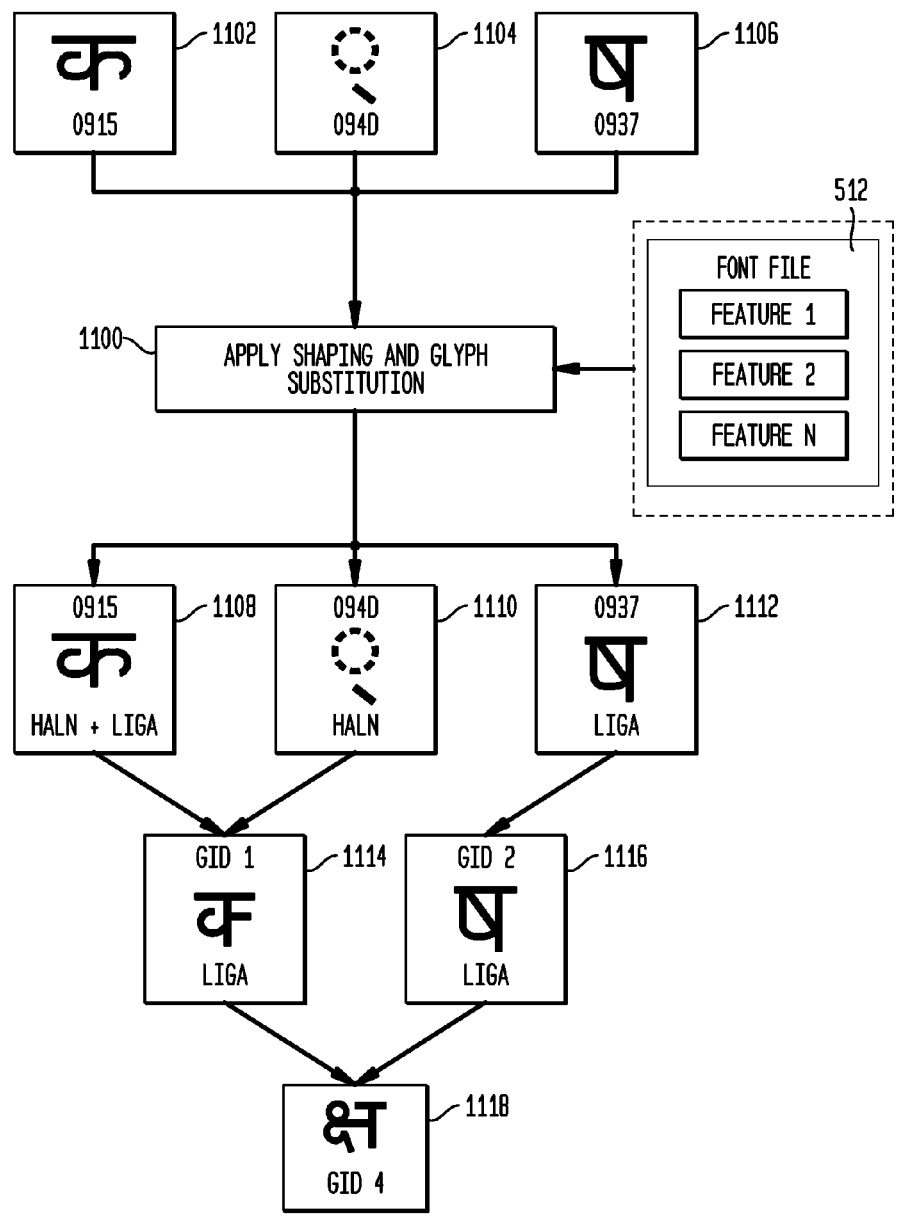
FIG. 11 illustrates an example of applying shaping and glyph substitution operations to a Unicode sequence.

An example of applying shaping and glyph substitution operations to a Unicode sequence according to an illustrative embodiment is described with reference to FIG. 11. Shaping and glyph substitution 1100 is applied to a Unicode sequence containing three Unicode characters, a Ka character 1102 having a Unicode of 1102, a Halant character 1104 having a Unicode of 094d, and a Sha character 1106 having a Unicode of 0937. The cloud computing server(s) 402 access the font file 512 to obtain the font specific operations or rule sets (features) to be applied to each of the characters 1102, 1104, and 1106. The features are allocated from the font file 512 as Ka [HALN, LIGA] 1108+Halant [HALN] 1110+Sha [LIGA] 1112. The feature Halant [HALN] 1110 is applied on Ka and HALN to obtain Half Ka. The feature HALN is made by the Multiple operation. This drives the processing engine module to replace the two glyph IDs, corresponding to the characters 1102 and 1104, with one glyph ID 1114. The character 1106 is mapped to a glyph ID 1116. Then the Ligature (LIGA) feature is applied to the resultant two glyphs 1114 and 1116 to produce a glyph 1118.

After the cloud computing server 402 analyzes the font specific operation or rule set contained in the font file 512 for each glyph and applies the corresponding transformations to the glyphs, the cloud computing server 402 may map 514 the Unicode characters to the glyph IDs. The mappings 514 may result in one or more of the following mappings: one to one, many to one, one to many, and/or many to many. With the transformations a stream of glyph IDs may also be generated for the run, where one or more bears one of the above mapping relationships with the Unicode characters.

Additionally, the cloud computing server(s) 402 may analyze each character of the mapped Unicode to glyph ID sequence for each run and apply glyph positioning font features 1000 to each run. The cloud computing server(s) 402 may communicate with a font file 1002, which may be contained on the cloud computing server(s) 402 or on separate servers or computers, containing tables of glyph positioning features and other font related rules to be applied to the Unicode to glyph ID sequence for each run. The cloud computing server(s) 402 may communicate with one or more font files 1002 by accessing the font file(s) 1002 and searching the font file(s) 1002.

The cloud computing server(s) 402 may analyze the font specific operations or rule sets contained in the font file 1002 for each glyph and apply the corresponding glyph positioning transformations to the glyphs one by one. The cloud computing server(s) 402 may apply the GPOS application contained in the font file 1002. The GPOS application may include a number of low-level operations or rules, such as but not limited to single adjustment, pair adjustment, cursive attachment, mark to base attachment, mark to ligature attachment, mark to mark attachment, contextual, and changing contextual operations or rules. The single adjustment operation positions one glyph, such as a superscript or subscript. The pair adjustment operation positions two glyphs with respect to one another. The cursive attachment operation describes positioning for cursive scripts and other glyphs that are connected with some attachment points when rendered. The mark to base attachment operation positions the combining marks with respect to base/consonant glyphs, as when positioning dependent vowels, etc. The mark to ligature attachment operation positions combining marks with respect to ligature glyphs. The mark to mark attachment operation positions one mark relative to another mark. The contextual operation describes how to position one or more glyphs in context. The chaining contextual operation describes how to position one or more glyphs in a chained context. Any combination of the low-level operations or rules can make a feature, wherein the features are registered per script or script family. It should be appreciated that the shaping process can assign the features for GSUB and GPOS in one parse of Unicode of a run, and the substitution is generally done before the positioning.

Figure 12:
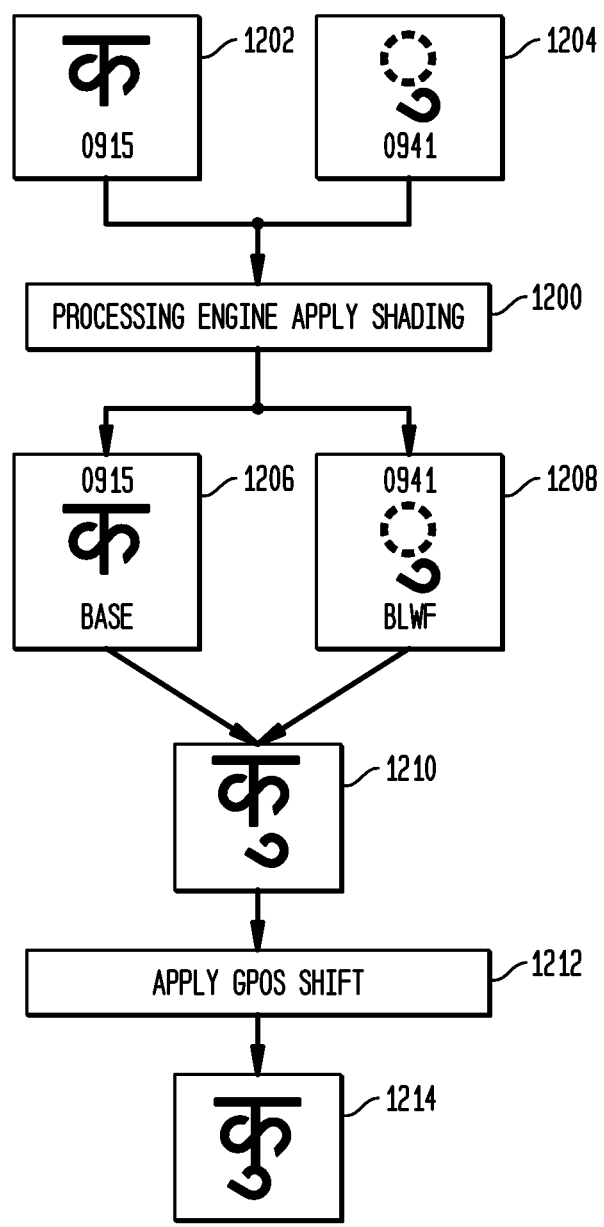
FIG. 12 illustrates an example of applying shaping and glyph positioning operations to a Unicode sequence.

As an example, the GPOS transformation for a consonant (Ka) and the dependent vowel (Uu) can be done with Feature Below Base Marks, which is implemented by a single operation, the mark to base attachment operation. An example of applying shaping and glyph positioning operations to a Unicode sequence according to an illustrative embodiment is described with reference to FIG. 12. Shaping 1200 is applied to a Unicode sequence containing two Unicode characters, a Ka character 1202 having a Unicode of 0915 and a Uu character 1204 having a Unicode of 0941. More specifically, shaping is applied to identify the set of features to be applied to each character glyph. As illustrated, the feature BASE 1206 is allocated to the character 1202 and the feature BLWF 1208 to the character 1204. The characters 1202 and 1204 are combined to form the character glyph 1210. The feature BLWF 1208 is applied 1212 on the character 1204 of the character glyph 1210, by executing the mark to base attachment operation, which positions the combining marks with respect to base/consonant glyphs, as when positioning dependent vowels, etc. A delta positioning value is returned and is added while the dependent vowel, character 1204, is repositioned along the horizontal axis (X axis) to produce the base constant 1214 with the correctly positioned dependent vowel.

Referring back to FIG. 10, in an illustrative embodiment, the relative position of a glyph for rendering may be repositioned along the x and/or y axis through glyph positioning. This delta position change is generated after the application of the positioning related font rules contained in the font file 1002. With the positioning a stream of delta positioning data may be generated for each run. After the cloud computing server(s) 402 applies the corresponding glyph positioning transformations, the cloud computing server(s) 402 may generate an output 1004. The output 1004 may contain glyph ID and glyph positioning data for each run based on the complex script from the web page request 500 sent by the client device(s) 400.

Figure 13:
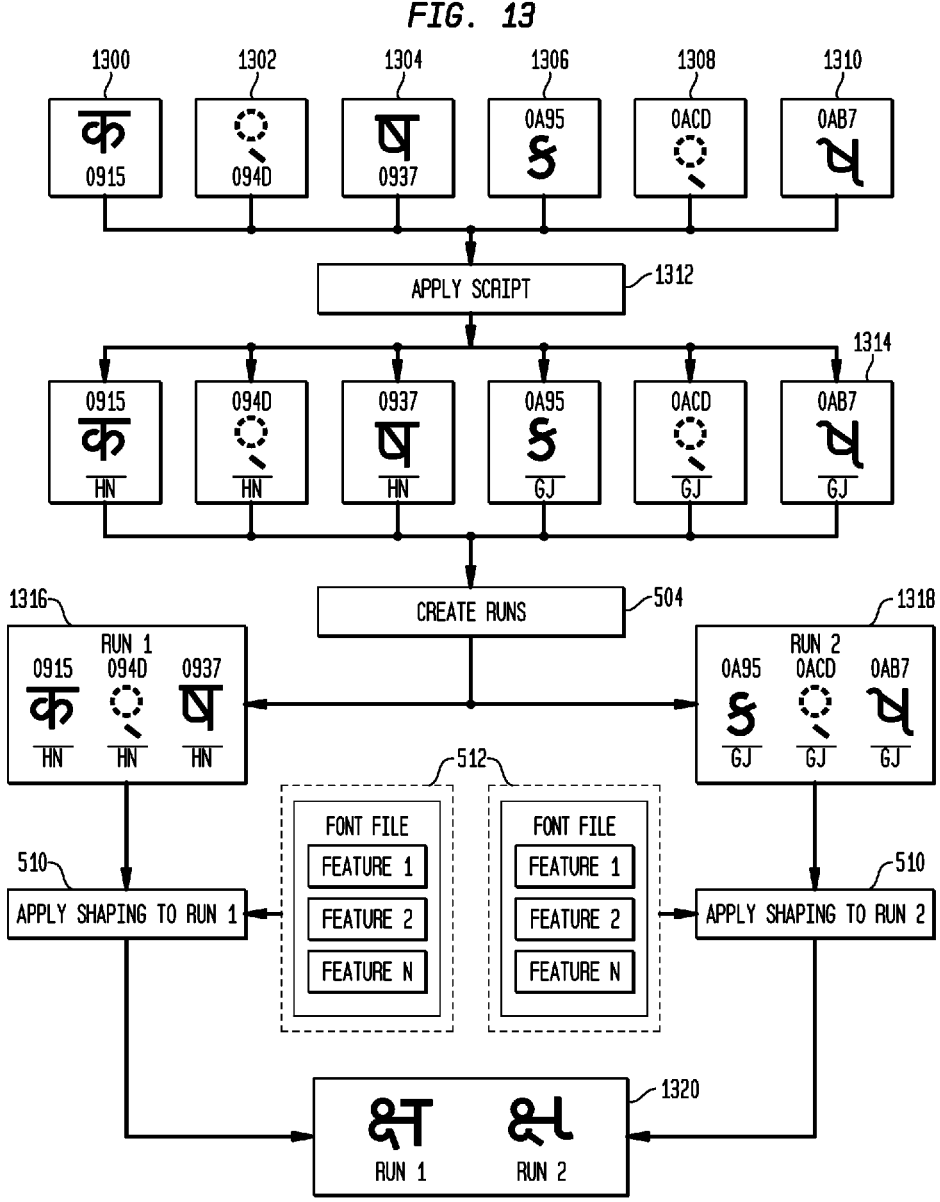
FIG. 13 illustrates an example of processing a Unicode sequence through the system and method for displaying complex scripts through cloud computing technology.

An example of processing a Unicode sequence through the system and method for displaying complex scripts through cloud computing technology according to an illustrative embodiment is described with reference to FIG. 13. The cloud computing sever(s) 402 parse the text of a request resulting in a Unicode sequence containing six characters. The Unicode sequence contains a character 1300 having a Unicode of 0915, a character 1302 having a Unicode of 094d, a character 1304 having a Unicode of 0937, a character 1306 having a Unicode of 0A95, a character 1308 having a Unicode of 0ACD, and a character 1310 having a Unicode of 0AB7. The script type for each of the characters 1300, 1302, 1304, 1306, 1308, and 1310 is identified and applied 1312 to each of the characters. Glyph IDs are found from the respective font file(s) and assigned or mapped 1314 to each of the characters.

The cloud computing server(s) 402 then create runs 504 based on the script type of the characters. As illustrated, the Unicode sequence is broken into two runs, Run 1 1316 and Run 2 1318 each containing three characters. Run 1 1316 contains the characters 1300, 1302, and 1304. Run 2 1318 contains the characters 1306, 1308, and 1310. The shaping, glyph substitution, and/or glyph positioning operations and transformation are applied 510 to each of the Runs 1316 and 1318. More specifically, features are identified from the font files 512 and assigned to each of the character glyphs 1300, 1302, 1304, 1306, 1308, and 1310 for each of the runs 1316 and 1318. Then the features are applied 510 on each of the character glyphs for each of the runs from the respective font files 512. The cloud computing server(s) then produce a resultant two runs 1320 with new glyphs for each run.

Figure 14:
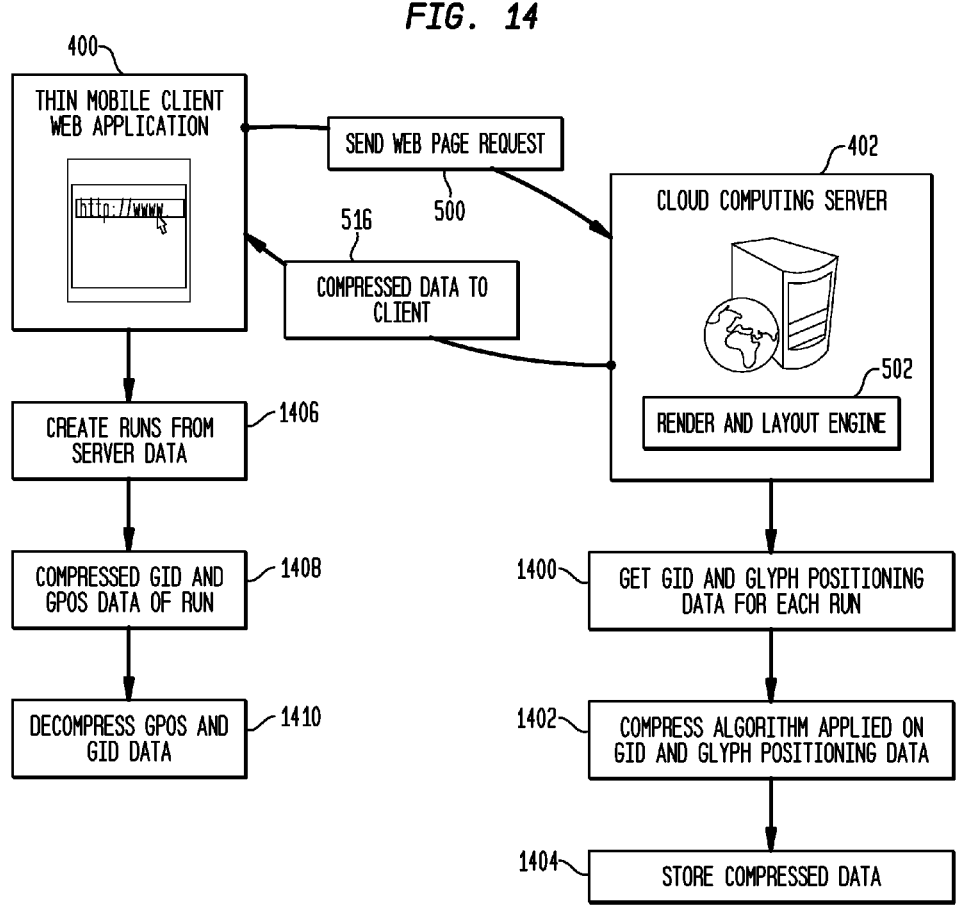
FIG. 14 illustrates a method of sending the glyph ID and glyph positioning data to a client device.

A method of sending the glyph ID and glyph positioning data to the client device(s) 400 according to an illustrative embodiment is described with reference to FIG. 14. The cloud computing server(s) 402 may obtain 1400 the glyph ID and glyph positioning data for each run, output 1004. The cloud computing server(s) 402 may then optimize and compress 1402 the glyph ID and positioning data, wherein optimization and compression reduces the payload size and the time in transferring the data from computing server(s) 402 to the target client device(s) 400.

In an illustrative embodiment, the glyph ID data stream consists of glyph ID values ranging from 0 to the max number of glyph in the font minus 1, and the glyph positioning data consists of X or Y or X & Y delta positioning values. To compress the glyph ID and glyph positioning data any standard compression method can be applied to all of the data, such as a Lempel-Ziv-Welch (LZW) compression algorithm or an altered version of popular compression algorithms.

To optimize and store the glyph ID data effectively, the data can be encoded, for example, in a 8-bit Unicode Transformation Format (UTF8), which should ensure that the right number of bytes are dedicated to represent a particular value of the glyph ID. For the glyph positioning data, instead of dedicating an integral number of 8 bits for each delta positioning value, based on the maximum value of the delta positions, less than 8 bits (for example, 2, 4, or 6) are dedicated for each delta positioning value. This results in a reduction of the glyph positioning data to about 75-25% of the data size. Also, the delta positioning data is stored only for the glyphs who are candidates, not for all of the glyphs.

The optimized and compressed glyph ID and positioning data may be stored 1404, by the computing server(s) 402. The computing server(s) 402 may store the optimized and compressed glyph ID and positioning data in a transient memory until all of the web content containing complex script, each run, is processed as described above.

The cloud computing server(s) 402 may then transmit 516 the optimized and compressed data back to the client device(s) 400. Upon receiving the optimized and compressed data the client device(s) 400 may extract 1406 each run having glyph ID and positioning data from the binary stream from the cloud computing server(s) 402 to obtain the compressed glyph ID and positioning data 1408 for each run. The client device(s) 400 may then decode and decompress 1410 the compressed glyph ID and positioning data 1408 for each run, run by run, to be rendered on the display of the client device(s) 400.

In an illustrative embodiment, the client device(s) 400 decompress the glyph ID and positioning data 1408 using any standard compression method, such as the Lempel-Ziv-Welch (LZW) compression algorithm or an altered version of popular compression algorithms. After the client device(s) 400 decompresses the glyph ID and positioning data 1408, there are two parts for the binary data of a complex string, the glyph ID data and the glyph positioning data. The glyph ID data stream is decoded by Unicode Transformation Format (UTF) decoding of the stream and each value is stored in a 16-bit data type. This glyph ID data is used to fetch the glyph from the font file. Further, the existence of the glyph positioning data is checked for each character. If the glyph positioning data exists, the delta positioning value of the glyph positioning data is upgraded to one byte (8 bits) or two bytes (16 bits) and used while rendering the glyph.

The system and method for displaying complex scripts may utilize client side font rendering support, to allow a user to input the complex text and also treat text as text while transferring the data from the cloud computing server 402 to the client device 400 to save the data bandwidth and provide speedy rendering. More specifically, after transferring 516 the compressed data to the client device(s) 400, the glyph ID stream and the positioning data may be passed to a font rendering engine module on the client device(s) 400 to render the text elements. The client device's 400 font rendering engine may receive the glyph data for each glyph ID from the resident font data, apply the corresponding positioning data if applicable and render the data on the display area of the client device(s) 400.

Figure 15:
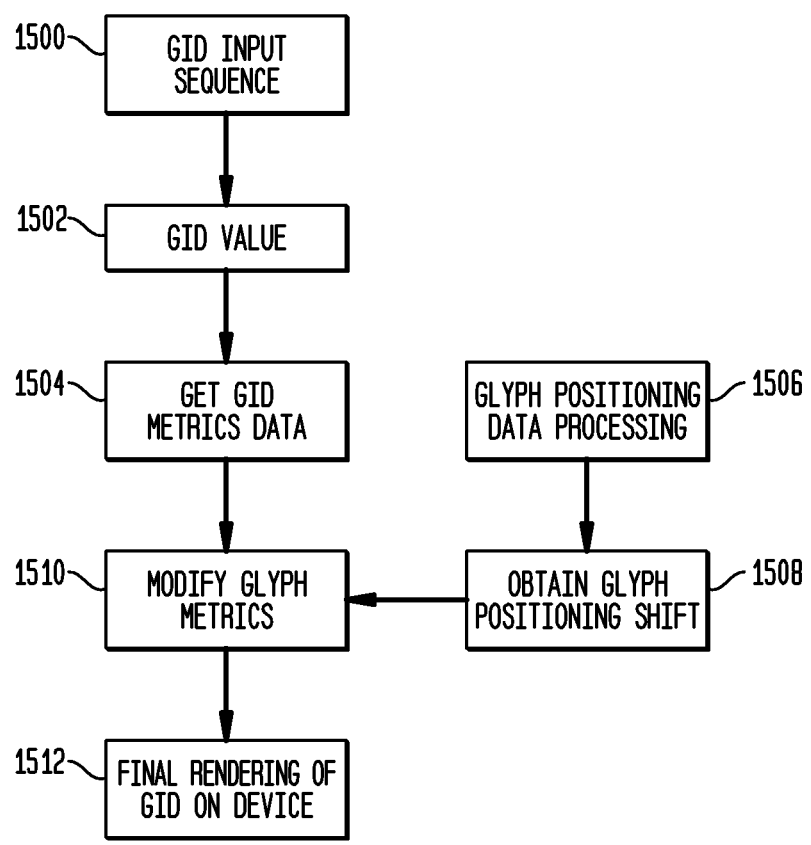
FIG. 15 illustrates a method of rendering complex script on the client device.

A method of rendering complex script on a client device 400 according to an illustrative embodiment is described with reference to FIG. 15. After transferring 516 the compressed data to the client device(s) 400, the client device's 400 font rendering engine may decompress a glyph ID input sequence 1500 from the mapped sequence of Unicode and glyph IDs corresponding to one or more runs containing complex script. The client device's 400 font rendering engine may then parse the mapped sequence of Unicode and glyph IDs to obtain a glyph ID 1502 from the sequence. The client device's 400 font rendering engine may obtain the metrics 1504 of the glyph corresponding to the glyph ID 1502 from the locally stored font.

Additionally, the client device's 400 font rendering engine may decompress the glyph positioning data 1506 from the mapped sequence of Unicode and glyph IDs corresponding to one or more runs containing complex script. The client device's 400 font rendering engine may then obtain delta shift data 1508, such as data corresponding to a shift along the x and/or y axis, for a glyph in the glyph ID array. The client device's 400 font rendering engine may apply the delta shift data 1508 to the metrics 1504 of the glyph corresponding to the glyph ID 1502 in the glyph ID array to obtain new metrics 1510. Then the client device's 400 font rendering engine may render 1512 the glyph corresponding to the glyph ID 1502 with the new metrics 1510 obtained after the glyph positioning process on the display area of the client device(s) 400. This process may be repeated until all the runs have been processed and rendered.

In another embodiment, the system and method applies to an input mechanism, which uses the system and method to allow the user of a client device(s) 400 to input and view the correct text with complex scripts on the client device(s) 400. The input mechanism is applicable to, but not limited to, numeric and QWERTY keypads, and other input mechanisms.

Figure 16:
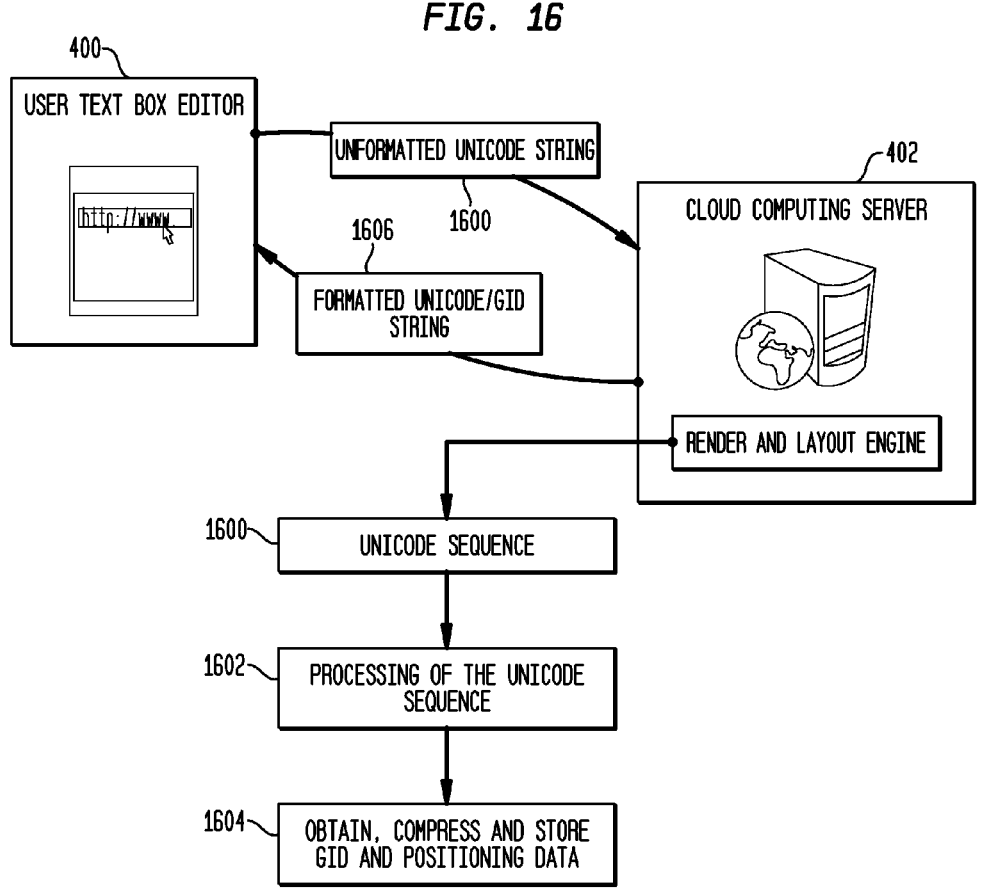
FIG. 16 illustrates a method of displaying complex scripts on the client device based on a user's input with a cloud computing architecture.

A method of displaying complex scripts on a client device(s) 400 based on a users input mechanism with the cloud computing architecture according to an illustrative embodiment is described with reference to FIG. 16. A user of the client device(s) 400 may input a complex script text/Unicode sequence in a text field. The unformatted Unicode sequence of characters 1600 input on the client device(s) 400 may be sent, e.g. via the internet, by the client device(s) 400 to the cloud computing server(s) 402. The cloud computing server(s) 402 may receive the unformatted Unicode sequence 1600. The cloud computing server(s) 402 may process the Unicode sequence 1600. In an illustrative embodiment the cloud computing server(s) 402 may process 1602 the Unicode sequence 1600 in accordance with the system and methods detailed above to obtain a correctly formatted Unicode sequence 1606 containing runs having a mapped array of Unicode and glyph IDs, along with glyph positioning data for each run.

More specifically, the cloud computing server(s) 402 may process 1602 the Unicode sequence 1600 by creating runs, mapping the Unicode values to the glyph IDs for each run, and applying shaping, glyph substitution, and glyph positioning to each run in accordance with the font specific operations and rules for each run, as described above. The cloud computing server(s) 402 may then obtain, optimize and compress, and store 1604 the glyph ID and glyph positioning data for each run, as described above with reference to FIG. 14. After the Unicode sequence 1600 has been processed, the cloud computing server(s) 402 may transmit the correctly formatted Unicode sequence 1606 to the client device(s) 400 to be input in the text field of the client device(s) 400.

Figure 17:
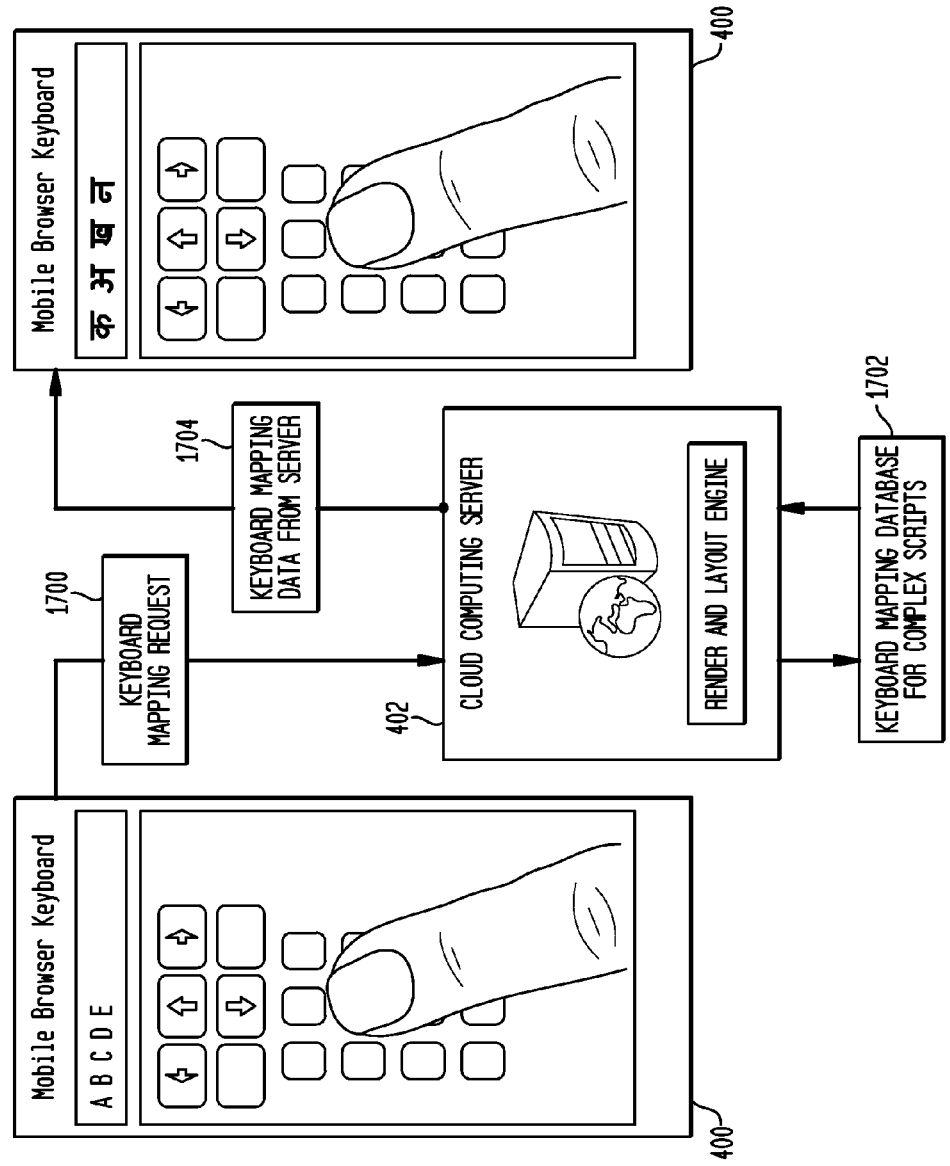
FIG. 17 illustrates a method of transferring a map file for an input mechanism of a complex script to the client device.

As illustrated in FIG. 17, the cloud computing server 402 may transfer one or more keyboard map files 1704 to the client device(s) 400 for the input of complex script. Depending on the keypad type of the client device(s) 400, the mapping of each key to the set of Unicode characters of a particular script may be stored in a map file. A single key of the client device(s) 400 may be mapped to multiple Unicode characters and may be accessed through multiple taps of the key. To support several scripts on the same client device(s) 400, multiple map files may be made to map the same keypad to multiple scripts. These mappings may not be pre-installed or stored at client device(s) 400, but stored on the cloud computing server(s) 402, and downloaded by the client device(s) 400 on demand. There may be more than one map file installed and the user of the client device(s) may switch between the map files to allow the user to enter Unicode values of more than one script. Thus, pressing keys of the client device(s) 400 may result in the insertion of Unicode values, based on the mapping.

A method of transferring a map file for an input mechanism of a complex script to a client device(s) 400 according to an illustrative embodiment is described with further reference to FIG. 17. As illustrated in FIG. 17, a user of the client device(s) 400 may input characters into the client device(s) 400, which may not have any keyboard mapping for the desired complex script. The user of the client device(s) 400 may send a keyboard mapping request 1700 to the cloud computing server(s) 402. The cloud computing server(s) 402 may receive the keyboard mapping request 1700 and obtain keyboard mapping data for various scripts from at least one keyboard mapping database 1702, which may be on the cloud computing server(s) 402 or on a separate server or computer. There may be more than one mapping for a script based on the keyboard type. The cloud computing server(s) 402 may then find the correct keyboard mapping data 1704 and transmit the keyboard mapping data 1704 to the client device(s) 400. The keyboard mapping data 1704 may be optimized and compressed and transmitted from the cloud computing server(s) 402 to the client device(s) 400 as a compressed binary stream.

Thus, in a webpage text field or any text field of the application, pressing keys of the client device(s) 400 should result in the insertion of Unicode values, based on the keyboard mapping data 1704. However, in the case of complex script sequences, the Unicode entered may not be shaped and/or transformed correctly while being entered. Thus, after the user of the client device(s) 400 has finished entering/inputting the text, the Unicode stream may be sent to the cloud computing server(s) 402 for correct shaping and/or transformation.

Figure 18:
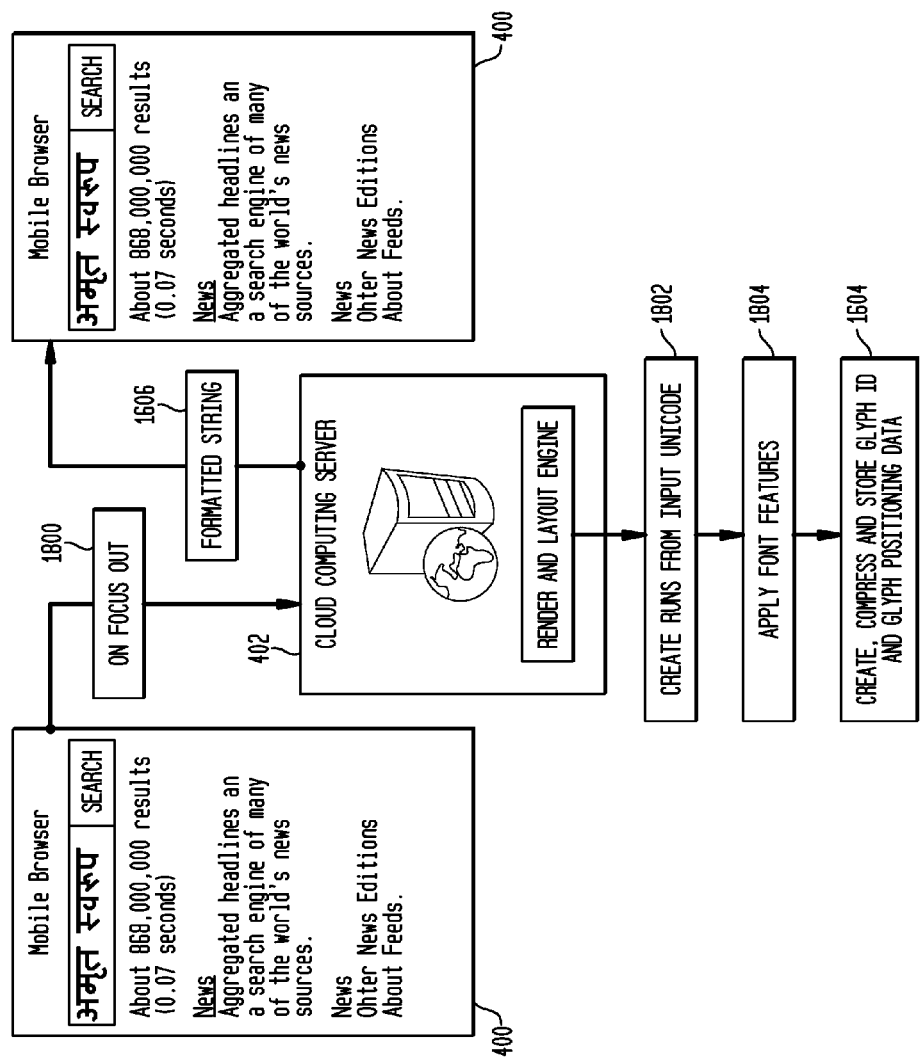
FIG. 18 illustrates a method of shaping and/or transforming a complex script input on the client device.

A method of shaping and/or transforming a complex script input on the client device according to an illustrative embodiment is described with reference to FIG. 18. As illustrated in FIG. 18, a user of the client device(s) 400 may input a complex sequence into a webpage text input field being accessed by the client device(s) 400 using the keyboard mapping data 1704. The user of the client device(s) 400 may then send the complex input sequence to the cloud computing server(s) 402. The complex input sequence may be sent automatically to the cloud computing server(s) 402 as soon as the user of the client device(s) 400 focuses out 1800 of the text input field. A user may focus out 1800 of the text input field, by moving out of the text input field after inputting the complex sequence into the text input field. The cloud computing server(s) 402 may receive the complex input sequence and create runs from the input Unicode sequence 1802. The runs may be created as described above.

After creating the runs, the cloud computing server(s) 402 may process and map the runs and apply font features 1804 to the runs. As described above the cloud computing server 402 may map the Unicode values to the glyph IDs for each run, and applying shaping, glyph substitution, and glyph positioning to each run in accordance with the font specific operations and rules for each run. The cloud computing server(s) 402 may then obtain, optimize and compress, and store 1604 the glyph ID and glyph positioning data for each run, as described above with reference to FIG. 14. The cloud computing server(s) 402 may then transmit the run data, containing the collection of runs, each run having the script detail, Unicode stream and corresponding glyph ID stream, along with the positioning details for glyphs to the client device(s) 400. Thus, the cloud computing server(s) 402 may transmit the correctly formatted complex sequence 1606 to the client device(s) 400 to be input into the text field input on the client device(s) 400.

Although the systems and methods disclosed herein have been described and illustrated in connection with thin clients, such as mobile/handheld devices, and or mobile browsers, the system and method for displaying complex scripts through cloud computing technology can be used in connection with large screen computers, computers with high computation power, memory, and/or bandwidth to the Internet, stationary TVs, as well as other such devices. Further, the systems and methods disclosed herein can be used outside of browsers, for example in connection with a device's user interface and/or to view documents besides web based content, such as pdf. documents, word documents, and other such documents.

While the system and method for displaying complex scripts through cloud computing technology has been described and illustrated in connection with illustrative embodiments, many variations and modifications will be evident to those skilled in the art and may be made without departing from the spirit and scope of the disclosed system and method. As one such example, the system and method disclosed herein may be used in connection with large screen computers, and/or computers with high computation power, memory, and/or bandwidth to the Internet. The disclosure is thus not to be limited to the precise details of methodology or construction set forth above as such variations and modification are intended to be included within the scope of the disclosed system and method.

What is claimed is:

1. A method for rendering complex script for display comprising:
    receiving, by a cloud computing server as part of a cloud computing architecture, a request from a client device, said request containing text including a complex script;
    parsing, by said cloud computing server, said text to a sequence of characters belonging to a particular script;
    mapping, by said cloud computing server, a character in said sequence of characters to at least one glyph ID;
    applying, by said cloud computing server, a font feature to said character in said sequence of characters;
    applying, by said cloud computing server, a glyph positioning operation to said character in said sequence of characters; and
    transmitting, by said cloud computing server, data corresponding to at least one of said application of said font feature and said glyph positioning operation to said client device to be rendered on said client device.

2. The method according to claim 1, further comprising compressing, by said cloud computing server, said data corresponding to said application of said font feature.

3. The method according to claim 1, wherein said receiving said request includes receiving a webpage request, said webpage containing complex script.

4. The method according to claim 1, wherein said applying said font feature includes applying a glyph substitution operation to said character in said sequence of characters.

5. The method according to claim 1, wherein said applying said font feature includes applying a shaping operation to said character in said sequence of characters.

6. The method according to claim 1, further comprising identifying, by said cloud computing server, a script type of each said character in said sequence of characters.

7. The method according to claim 1, wherein said mapping includes mapping said character to said at least one glyph ID having a mapping type selected from the group consisting of one to one, many to one, one to many, and many to many.

8. The method according to claim 1, further comprising communicating, by said cloud computing server, with a font file containing said at least one font feature.

9. The method according to claim 8, further comprising identifying, by said cloud computing server, said at least one font feature contained in said font file to be applied to said character in said sequence of characters.

10. The method according to claim 9, further comprising assigning, by said cloud computing server, to said character in said sequence of characters said at least one font feature contained in said font file.

11. A system for rendering complex script for display comprising:
   a cloud computing server as part of a cloud computing architecture;
   a render and layout engine module on said cloud computing server configured to parse text lines of a web page and apply complex script operations;
   at least one font file on said cloud computing server containing a plurality of font features corresponding to a script; and
   at least one processing engine module on said cloud computing server in communication with said at least one font file, said at least one processing engine module configured to access said at least one font file and obtain said font features corresponding to said script, and said
   at least one processing engine module configured to apply a glyph positioning operation to a character in a sequence of characters.

12. The system according to claim 11, wherein said plurality font features contained in said font file correspond to a transformation rule.

13. The system according to claim 12, wherein said at least one processing engine module is configured to apply said transformation rule to a Unicode character.

14. The system according to claim 11, wherein said at least one processing engine module is configured to map a Unicode value of a Unicode character to a particular glyph ID.

15. A method for rendering complex script for display based on a user's input comprising:
   receiving, by a cloud computing server as part of a cloud computing architecture, a keyboard mapping request from a client device;
   obtaining, by said cloud computing server, keyboard mapping data from at least one keyboard mapping database;
   transmitting, by said cloud computing server, said keyboard mapping data to said client device;
   receiving, by said cloud computing server, a complex input sequence from said client device;
   applying, by said cloud computing server, a glyph positioning operation to a character in a sequence of characters;
   applying, by said cloud computing server, at least one font feature to said complex input sequence; and
   transmitting, by said cloud computing server, data corresponding to at least one of said application of said font feature and said glyph positioning operation to said client device to be rendered on said client device.

16. The method according to claim 15, wherein said applying said font feature includes applying a glyph substitution operation to said complex input sequence.

17. The method according to claim 15, wherein said applying said font feature includes applying a shaping operation to said complex input sequence.

18. The method according to claim 15, further comprising mapping, by said cloud computing server, a character in said complex input sequence to at least one glyph ID.

* * * * *